Patented Feb. 14, 1950

2,497,235

UNITED STATES PATENT OFFICE 2,497,235 pH-RESPONSIVE GLASS ELECTRODES

George A. Perley, Wyncote, Pa., assignor to Leeds and Northrup Company, Philadelphia, Pa., a corporation of Pennsylvania No Drawing. Application December 12, 1947, Serial No. 791,461

6 Claims. (Cl. 204—195)

My invention relates to pH-responsive glass electrodes, utilizable for example in determination of magnitudes of pH, representative of the magnitudes of concentrations of hydrogen-ions or hydroxyl-ions or, more simply, for determination of the degrees of acidity or alkalinity of solutions; more particularly my invention in concerned with electrode glasses, of new compositions exhibiting characteristics hereinafter referred to, from which may be blown or otherwise formed the significant pH-responsive glass membranes of electrode structures.

The more significant qualities of my herein described and claimed pH-responsive electrodes of glass are:

Electrical volume-resistances of significantly new low orders of magnitude, rendering the measuring of pH substantially free of interfering external electrical effects and permitting use of simpler or less sensitive measuring instruments; sodium errors, after prolonged continuous use of my electrode in test solutions at ordinary or high temperatures (e. g. near 90° C.), as low as, or even lower than, those of heretofore known glass electrodes; and a voltage/pH characteristic which is reproducible and rectilinear, like that of the hydrogen electrode, from 0 pH to 14 pH in event of absence from the test solution of ions of sodium, potassium, or lithium, and in event of presence of such ions it is rectilinear and reproducible from 0 pH to about 9 pH and from there on to 14 pH is reproducible. The slope of the rectilinear characteristic at 25° C. is defined by the fact a change of about 59.1 millivolt corresponds with 1 pH, therefore following the Nernst equation.

Further in accordance with my invention it is characteristic of my glasses that they are broadly fundamentally of the lithia-silica class, with inclusion of one or more of the oxides $Cs_2O$, $Rb_2O$, $K_2O$, $Na_2O$ and those herein contemplated oxides having the effect of increasing the ratio of oxygen to silicon in the glass network; the one or more oxides aforesaid in combination with the lithia-silica mixture per se imparts or improves workablity, besides improving it in one or more of the aspects of low sodium error, low electrical volume-resistance, operating stability and reproducibility and/or slope of the voltage/pH characteristic.

This application is a continuation-in-part of my application Serial No. 668,393, filed May 9, 1946, upon which issued Patent No. 2,444,845.

My invention resides in pH measuring electrodes of glasses having the characteristics hereinafter described.

For an understanding of my invention reference may be had to Table I below, which includes examples of my preferred and additional glasses comprehended by my invention.

*Table I*

| No. | Composition in Mol Percent | | | | | | | Res. at 25° C., Megs. | pH Error at 25° C., 2 Normal Na, 12.8 pH | | |
|---|---|---|---|---|---|---|---|---|---|---|---|
| | $Li_2O$ | $Cs_2O$ | $Rb_2O$ | $K_2O$ | $Na_2O$ | $La_2O_3$ | $SiO_2$ | | Days | Months | |
| | | | | | | | | | 5 | 1 | 6 |
| A | 30 | 2 | 0 | 0 | 0 | 2 | 66 | 15 | 0.60 | 1.03 | 1.50 |
| B | 28 | 3 | 0 | 0 | 0 | 4 | 65 | 35 | 0.15 | 0.10 | 0.20 |
| C | 27 | 3 | 0 | 0 | 0 | 3 | 67 | 40 | 0.25 | 0.35 | 0.40 |
| D | 28 | 3 | 0 | 0 | 0 | 5 | 64 | 40 | 0.10 | 0.08 | 0.09 |
| E | 28 | 0 | 3 | 0 | 0 | 5 | 64 | 85 | 0.35 | 0.24 | 0.70 |
| F | 28 | 0 | 3 | 0 | 0 | 4 | 65 | 70 | 0.30 | 0.35 | 0.70 |
| G | 28 | 0 | 0 | 3 | 0 | 4 | 64 | 75 | 1.00 | 1.15 | 1.20 |
| H | 28 | 0 | 0 | 3 | 0 | 4 | 65 | 60 | 1.30 | 1.50 | 1.66 |
| I | 28 | 0 | 0 | 0 | 3 | 5 | 64 | 280 | 1.21 | 1.55 | 1.55 |
| J | 28 | 0 | 0 | 0 | 3 | 4 | 65 | 220 | 1.60 | 1.72 | 2.00 |
| K | 28 | 2 | 3 | 0 | 0 | 4 | 63 | 105 | 0.35 | 0.30 | 0.60 |
| L | 26 | 2 | 3 | 0 | 0 | 4 | 65 | 190 | 0.10 | 0.20 | 0.80 |
| M | 26 | 3 | 0 | 0 | 2 | 5 | 64 | 2100 | 0.15 | 0.10 | 0.05 |
| N | 26 | 3 | 0 | 0 | 2 | 4 | 65 | 900 | 0.12 | 0.11 | 0.25 |
| O | 26 | 2 | 0 | 3 | 0 | 4 | 65 | 45 | 0.35 | 0.34 | 0.80 |
| P | 28 | 0 | 0 | 0 | 0 | 5 | 67 | 25 | 1.30 | 1.35 | 1.35 |
| Q | 28 | 2 | 0 | 0 | 0 | 2 | 68 | 40 | 0.70 | 0.85 | 1.13 |
| R | 28 | 3 | 0 | 0 | 0 | 4($Pr_2O_3$) | 65 | 30 | 0.17 | 0.28 | 0.40 |
| S | 28 | 3 | 0 | 0 | 0 | 4($TiO_2$) | 65 | 5 | 1.20 | 2.00 | 2.80 |
| T | 28 | 3 | 0 | 0 | 0 | 4($MnO_2$) | 65 | 110 | 1.66 | 1.80 | 2.90 |
| U | 28 | 3 | 0 | 0 | 0 | 5($Mn_2O_3$) | 64 | 6,600 | 0.30 | 0.20 | 0.50 |
| V | 28 | 3 | 0 | 0 | 0 | 0 | 69 | 10 | 1.85 | 2.50 | 2.50 |

It is a broad aspect of my invention that in addition to silica and lithia there shall be used one or more constituents of the broad group consisting of the two sub-groups which are, respectively, the oxides later referred to and including $La_2O_3$ and the oxides of the alkali metals $Cs_2O$, $Rb_2O$, $K_2O$ and $Na_2O$, so that, broadly expressed, my invention is exemplified by the mixture of the formula:

(1) $SiO_2$—$Li_2O$—one or more oxides of the group consisting of the oxides $TiO_2$, $MnO_2$, $Mn_2O_3$ and the rare earth metal oxides including $La_2O_3$ and $Pr_2O_3$, and $Cs_2O$, $Rb_2O$, $K_2O$, $Na_2O$.

In general, and broadly, the qualitative aspects of my invention, as represented by the prefusion compositions of my glasses, are shown by the foregoing and following formulae:

(2) $Li_2O$—$Cs_2O$ (and/or $Rb_2O$)—$SiO_2$; or
(3) $Li_2O$—$SiO_2$—$La_2O_3$ (generically representing one or more of the oxides consisting of $TiO_2$, $MnO_2$, $Mn_2O_3$ and the rare earth metal oxides including $La_2O_3$ and $Pr_2O_3$); or
(4) $Li_2O$—one or more of $Cs_2O$, $Rb_2O$, $K_2O$, $Na_2O$—$SiO_2$—$La_2O_3$ (generically representing one or more of the oxides consisting of $TiO_2$, $MnO_2$, $Mn_2O_3$ and the rare earth metal oxides including $La_2O_3$ and $Pr_2O_3$).

For procuring or increasing workability of the fundamental $Li_2O$—$SiO_2$ (lithia-silica glass) mixture, there may be included in the mixtures of foregoing Formula 4 either or both of the oxides $K_2O$ and $Na_2O$ preferably in proportion or proportions not materially affecting one or both of the characteristics low electrical volume-resistance and low sodium error.

None of foregoing four formulae, broadly definitive of my invention, includes an oxide of any of the alkaline earth metals one or more of which heretofore commonly has constituted a component of pH-responsive glasses.

$Li_2O$ of the foregoing formulae is important as conducive to or for attaining suitably low electrical volume-resistance and is effectively usable herein for such purpose and, in general, it is of import in the matter of reduction of sodium error in event the test solution contains sodium-ions.

Within the limits set forth in Table I, $SiO_2$, the other component of the fundamental $Li_2O$—$SiO_2$ mixture of my glasses, while in general favorable to imparting or contributing to the glass low electrical volume-resistance, is conducive to high sodium error. However $SiO_2$ with $Li_2O$ together constitute the fundamental and greatest component of my prefusion mixtures, and they together impart to or procure for my glasses low electrical volume-resistance and low or at least moderate sodium error.

In the foregoing Formulae 2 and 4, $Cs_2O$ and/or $Rb_2O$ has the effect of imparting operating chemical stability or durability to the glass and is of importance in procuring or contributing to procuring low sodium error; which characteristics obtain also with respect to the oxides herein contemplated and examples of which appear below; furthermore, any one or more of $Cs_2O$, $Rb_2O$, $K_2O$ and $Na_2O$ renders the $SiO_2$—$Li_2O$ mixture workable for imparting thereto sufficient ruggedness and rigidity for practical purposes and for safely withstanding the necessary handling thereof incident to its use; and similarly the oxides of the group including $La_2O_3$, of Formulae 3 and 4, have the same or similar effects. The $Cs_2O$, $Rb_2O$, $K_2O$, $Na_2O$ and the oxides of the group including $La_2O_3$ are to useful degree interchangeable, as indicated by Formulae 2 and 3 in which the $Cs_2O$ and/or equivalent component and the oxides of the other group (including $La_2O_3$) are in general substitutable for each other, and also usable in conjunction with each other (Formula 4). Table I shows that a glass made up from a prefusion mixture of $SiO_2$, $Li_2O$, $La_2O_3$ with either $Na_2O$ or $K_2O$, requires the presence of $Cs_2O$ and/or $Rb_2O$ if a low sodium error is to be obtained. Thus $Cs_2O$ and/or $La_2O_3$ are essential for the production of low sodium error glasses.

In Formulae 3 and 4 $La_2O_3$ may constitute the oxide component employed, and in any event it generically represents any one or more of the oxides having any one or more of the effects of procuring or assisting to procure workability of the glass, reducing electrical volume-resistance, reducing sodium error, and increasing operating stability of the glass. One or more of the oxides used may be chosen from the group $P_2O_5$, $TiO_2$, $TeO_3$, $ZrO_2$, $Cb_2O_5$, $Ta_2O_5$, $ThO_2$, $B_2O_3$, $MnO_2$, $Mn_2O_3$, the rare earth metal oxides $La_2O_3$, $Pr_2O_3$, $Nd_2O_3$, $CeO_2$, and the oxides of the further rare earth metals yttrium, Yt; samarium, Sm; europium, Eu; gadolinium, Gd; terbium, Tb; dysprosium, Dy; holmium, Ho; erbium, Er; thulium, Tm; ytterbium, Yb; and lutecium, Lu.

Referring to Table I all of the prefusion glass compositions include $Li_2O$ in mol per cent ranging from 26 to 30, and $SiO_2$ ranging from 63 to 69. All of the prefusion glass compositions except No. P include at least one added alkali metal selected from the group consisting of $Cs_2O$, $Rb_2O$, $K_2O$ and $Na_2O$. Prefusion composition P includes 5 mol per cent of $La_2O_3$. All prefusion compositions in Table I except No. V include an oxide selected from the group consisting of $TiO_2$, $MnO_2$, $Mn_2O_3$ and the rare earth metal oxides $La_2O_3$ and $Pr_2O_3$. No. V includes $Cs_2O$, 3 mold per cent, a high percentage of silica, 69 mol per cent, and lithia, 28 mol per cent. Thus, the glass of prefusion composition V illustrates the lowered electrical volume resistance resulting from the relatively high mol percentages of lithia and silica with a sodium error which, though higher than the characteristics of other glasses from Table I, may be considered a moderate sodium error as compared with prior art glasses. No. P with its relatively high mol percentages of lithia and silica and the high mol percentage of $La_2O_3$ is illustrative of another composition for a glass of low volume electrical resistance with moderate sodium error, and with No. V forms the basis of the statement of limited interchangeability between the two sub-groups.

In Table I are found numerous compositions qualitatively and quantitatively exemplifying my invention in the broad sense they are respectively comprehended by qualitative Formulae 1, 2, 3 and 4 hereinbefore appearing, and quantitatively by Formulae 5, 6 and 7, within. Among the tabulated compositions it will be found that some (for example glasses or compositions L, M, U, N) whose sodium error is low, have electrical volume-resistances exceeding my preferred upper limit of about 100 megohms. Such compositions are satisfactory under conditions where low sodium error is of greater importance than low electrical resistance at 25° C.; when, however, the test solution is at higher temperatures the resistance is extremely low, and the sodium error not seriously impaired. Indicated sodium errors in terms of pH as appearing in Table I were measured under conditions of 2N sodium solution of 12.8 pH, at 25° C. It will be observed that all of the glasses of Table I have compositions represented by three-component prefusion mixtures in which the first component consists of about 69 mol per cent to about 63 mol per cent silica, a second component consisting of about 26 mol per cent to about 30 mol per cent lithia, and a third component consisting essentially of at least one oxide from the group $TiO_2$, $MnO_2$, $Mn_2O_3$ and the rare earth metal oxides including $La_2O_3$ and $Pr_2O_3$, and/or of at least one additional alkali metal oxide from the group $Cs_2O$, $Rb_2O$, $K_2O$ and $Na_2O$, the sum of the mol per cent of the first oxide group and the mol per cent of the added alkali metal oxide group being not less than about 3 nor more than about 10, the permissible mol per cent of the first oxide group ranging from 0 to about 5 with the permissible mol per cent of the added alkali metal oxide group in any case ranging from 0 to about 5. For composition No. P there is 0 mol per cent of any additional alkali metal oxide, while with composition No. V there is 0 per cent of the oxides of the first-named group. However, when the mol per cent of the oxides including $La_2O_3$ is less than 3, the balance of said sum is made up of $Cs_2O$. It is to be further observed, prefusion glass mixtures Nos. M and N, that where $Na_2O$ is present in the mixture, there is also included a greater mol per cent of the alkali metal oxide $Cs_2O$ than the mol per cent of $Na_2O$. For the foregoing conditions $Rb_2O$ may replace $Cs_2O$. It will be further observed, prefusion glass mixture No. O, that where there is present in the mixture $K_2O$, a mol per cent of the alkali metal oxide $Cs_2O$ of not less than about two-thirds that of the $K_2O$ is included. Again, $Rb_2O$ may be substituted for $Cs_2O$. The foregoing characteristics are common to the prefusion glass mixtures A–F and K–V.

Where low sodium error is of lesser importance than low electrical resistance, there may be used such compositions as exemplified by glasses A–H, O–S, and V. In the foregoing glasses it will be observed that the sum of the mol per cent of the oxide group including $La_2O_3$ and the mol per cent from the added alkali metal oxide group is not less than about 3 nor more than about 9. It is to be further observed that when the mol per cent of oxides including $La_2O_3$ is less than 3 (prefusion glass mixtures A, Q and V), the additional alkali metal oxide $Cs_2O$ is selected for the balance of said sum, and where the mol per cent of the oxide from the group including $La_2O_3$ is more than about 3 and there is to be a selection of two additional alkali metals, that selection shall be limited to $Cs_2O$ and $K_2O$ (prefusion glass mixture O).

And for examples of my glasses or compositions having both low sodium error and low electrical resistance, reference may be had to such glasses as B, C, D, E, F, K, O, and R. The foregoing glasses are four-component glasses, which have low sodium error, less than 1.0 pH after six months, and have electrical volume-resistances from 5 to 105 megohms. Glasses B, C, D, E, F, O and R have resistances from 5 to 85 megohms. It will be observed that for these compositions the sum of the mol per cent of the oxide of the group including $La_2O_3$ and the mol per cent of the added alkali metal oxide is not less than about 6 nor more than about 9. It will be further observed, as pointed out in connection with prefusion glass mixture O, that when there is present $K_2O$, then there is also present the alkali metal $Cs_2O$ in amount not less than about two-thirds the mol per cent of the $K_2O$. $Rb_2O$ may also be selected in place of $Cs_2O$.

For examples of my glasses or compositions having low sodium error (which at 25° C., 2 normal Na, is less than 1.0 pH, both after five days and after six months), reference may be had to such glasses as B–F, K–O, R and U. It will be observed that each glass is of the four-component type where the sum of the mol per cent of the oxide group including $La_2O_3$ and the mol per cent of the added alkali metal oxide group is not less than about 6 and not more than about 10. As already explained, in the foregoing prefusion mixtures, where the alkali metal oxide $K_2O$ is present, there is also present at least one of the alkali metal oxides $Cs_2O$ and $Rb_2O$ in amount not less than about two-thirds of the mol per cent of $K_2O$. For each mixture including the alkali metal oxide $Na_2O$, there is also present the alkali metal oxide $Cs_2O$ in amount about one and one-half times the mol per cent of the $Na_2O$. In the foregoing, $Rb_2O$ may be substituted for $Cs_2O$.

It is to be further observed that prefusion compositions B, C and D consist of four components as follows: silica 64–67 mol per cent, lithia 27–28 mol per cent, 3 mol per cent $Cs_2O$, and from 3–5 mol per cent $La_2O_3$, yielding glasses having relatively low volume electrical resistance and low sodium error.

The more specific, quantitative, aspect of my invention to which it is not limited i. e. suitable proportions (herein expressed in mol percentages) of the constituents of the prefusion mixtures for my glasses, is exemplified by the following formulae:

(5) From about 26% to about 30% $Li_2O$—from about 0% to about 5% of one or more $Cs_2O$, $Rb_2O$, $K_2O$, $Na_2O$—from about 63% to about 70% $SiO_2$;

(6) From about 26% to about 30% $Li_2O$—from about 63% to about 70% $SiO_2$—from about 0% to about 5% $La_2O_3$ (generically representing one or more of the oxide group which includes $La_2O_3$); or (7) From about 26% to about 30% $Li_2O$—from about 0% to about 5% of one or more $Cs_2O$, $Rb_2O$, $K_2O$, $Na_2O$—from about 63% to about 70% $SiO_2$—from about 0% to about 5% $La_2O_3$ (generically representing one or more of the oxides which include $La_2O_3$, $Pr_2O_3$, $TiO_2$, $MnO_2$ and $Mn_2O_3$.

It shall be understood that the aforesaid mol percentages, or ranges thereof, are not critical; it shall be understood that on these quantitative aspects of my invention that the use of percentages of one or more of the constituents of any particular mixture procures or assists in procuring one or more of the characteristics of my glasses, because even smaller proportions than those indicated and/or higher than those indicated are utilizable without departure from the broad aspects of my invention.

With respect to Formulae 5, 6 and 7 it shall be understood that for purposes of procuring or increasing workability of the fundamental, dominant, lithia-silica component per se, there may be included in my compositions as above described with respect to Formulae 1, 2, 3 and 4 either of the oxides $K_2O$ and $Na_2O$ preferably in amount which will maintain at approximately the original magnitude the total of the percentages of the respective components; which connotes that by such addition of either of $K_2O$ and $Na_2O$ there is permissible a decrease in percentage of one or more of the constituents $SiO_2$, $Li_2O$, $Cs_2O$ (and/or $Rb_2O$), $La_2O_3$ (generically representing one or more of the oxides $La_2O_3$, $Pr_2O_3$, $TiO_2$, $MnO_2$ and $Mn_2O_3$).

Of the glasses included in Table I, my preferred ones are those lettered B, C, D, E, F, K, L, M, N, O, Q, R, S, U; in glass Q of Table I the total of $Cs_2O$ and $La_2O_3$ components is about 4 mol per cent.

Aforesaid characteristically low electrical resistance of my glasses is of decided practical advantage because there may be used therewith, for example, a measuring system of potentiometer type with a galvanometer which has a current sensitivity of the order of $5 \times 10^{-10}$ ampere per millimeter of scale at a distance of 1 meter from the reflector of the galvanometer. In any event, the current passing through my low resistance electrode glasses is many times greater in magnitude than the magnitude of the necessarily extremely minute current passing through the high resistance electrode glasses heretofore commonly employed; for example, the magnitude of the current passing through my low resistance glasses is of the order of 100 or more times that obtaining with the high resistance glasses of aforesaid prior practice. Accordingly my glasses of low resistance connote the practicability of use therewith of measuring means which are relatively simple and less costly than those required for high resistance glasses. With my glasses of low volume-resistance there is not required to be used therewith either a measuring system of high impedance such, for example, as that of Patent 2,108,294, or as an alternative thereto an instrument such as a Compton type of quadrant electrometer. Measuring systems of the general type of that of aforesaid Patent 2,108,294, or the like, are of high impedance, because the impedance or resistance of the glass electrodes for which they are adapted is high, and therefore necessarily must deal with extremely minute currents passing through the electrode glasses whose resistance heretofore has been of significantly higher order than about 100 megohms.

The low resistance of my glasses is of further significant advantage because they render less significant or overcome those difficulties, encountered in industrial measurements of pH by glass electrodes of aforesaid high resistance heretofore commonly used, caused by external electrostatic fields which necessitate careful shielding of the apparatus or significant parts thereof, as exemplified by Patent 2,256,733; and/or caused by leakage currents, particularly when the apparatus is used under conditions of humidity of the ambient atmosphere, the leakage currents in some cases being more troublesome even than external electrostatic fields aforesaid.

The prefusion mixtures of oxides for my glasses are readily fusible at temperatures from about 1600° F. to about 2200° F., and the rate of fusion is greater, more rapid, than in the case where one or more oxides of the alkaline earth metals are present in the prefusion mixture; and temperatures from about 800° F. to about 1100° F. serve for working, including blowing, of my glasses.

Furthermore my glasses, besides having aforesaid significant lower electrical resistances than those having as heretofore a component of one or more of the oxides of the alkaline earth metals (such as Ca, Sr, Ba, Mg) the pH-response of my glasses is excellent; their sodium error is low and their stability or durability when continuously used over relatively long periods in contact with test solutions, containing sodium-ions and ranging in temperature from 25° C. to more than 90° C., is high; and their pH errors at 25° C., in 2 normal sodium of 12.8 pH, after continuous use for as long as six months, are low and range to as low as 0.09 pH, as indicated in aforesaid Table I; and for a membrane whose dimensional characteristics may be those of the example stated in my Patent No. 2,444,845, column 10, lines 48–50, namely, for bulbs of approximately 8 mm. to 9 mm. outside diameter, a weight of about .15 gram, joined to a stem of approximately 10 mm. internal diameter, and having membrane thickness of about .2 mm., aforesaid low electrical volume-resistances range from about 100 megohms at 25° C. to as low as 5 megohms or lower, and at temperatures of the test solutions up to about 90° C. said resistances at test solution temperatures diminish to small fractions, sometimes as low as a few thousandths of their magnitudes at 25° C. The volume-resistances of Table I were obtained in each case by measurement of resistances between conductors in solutions respectively disposed on opposite sides of and engaging all of the membrane of the glass electrode. The resistances of the membranes at 90° C. are approximately five-thousandths of the resistances at 25° C., the latter being the temperature at which the measurements were made for Table I.

It is an important aspect of my invention that the compositions of my glasses which have one or more of the characteristics aforesaid are represented by prefusion oxide mixtures which do not contain nor require any one or more of the oxides of the alkaline earth metals which, if present would, in some instances, contribute no improvement in any of the aforesaid characteristics but in some cases would be of disadvantage.

The proportions herein named are in mol percentages.

What I claim is:

1. A pH-responsive glass electrode including a conductive membrane of glass whose composition is represented by a three-component prefusion mixture free of the alkaline earth metals, the first component consisting of about 69 mol per cent to about 63 mol per cent silica, a second component consisting of about 26 mol per cent to about 30 mol per cent lithia, and the balance a third component consisting essentially of at least an oxide selected from a first group consisting of $TiO_2$, $MnO_2$, $Mn_2O_3$ and the rare earth metal oxides including $La_2O_3$ and $Pr_2O_3$, and of at least one added alkali metal oxide selected from a second group consisting of the following: $Cs_2O$, $Rb_2O$, $K_2O$ and $Na_2O$, the sum of the mol per cent of at least one of said oxides of said first group and at least one of said alkali metal oxides of said second group being not less than about 3 nor more than about 10, the permissible mol per cent of the oxides from said first group ranging from 2 to about 5, there being present in each mixture including $Na_2O$ a greater mol per cent of at least one of the alkali metal oxides $Cs_2O$ and $Rb_2O$ than the mol per cent of $Na_2O$, and there being present in each mixture including $K_2O$ a mol per cent of at least one of said alkali metal oxides $Cs_2O$ and $Rb_2O$ of not less than about two-thirds that of the $K_2O$, the mol per cent of alkali metal oxide ranging from 0 to about 5.

2. A pH-responsive glass electrode including an electrically conductive membrane of glass with a low electrical volume-resistance of the order of from 5 to 85 megohms at 25° C., the composition of said glass membrane being represented by a three-component prefusion mixture free of alkaline earth metals, the first component consisting of about 69 mol per cent to about 64 mol per cent silica, a second component consisting of about 26 mol per cent to about 30 mol per cent lithia, and the balance a third component consisting essentially of the sum of at least one oxide selected from a first group consisting of $TiO_2$ and the rare earth metal oxides including $La_2O_3$ and $Pr_2O_3$, and of at least one added alkali metal oxide selected from a second group consisting of the following: $Cs_2O$, $Rb_2O$ and $K_2O$, said sum of the mol per cent of at least one of the oxides of said first group and of at least one of the added alkali metal oxides of said second group being not less than about 3 nor more than about 9, the permissible mol per cent from said first group ranging from 2 to about 5, and the permissible mol per cent from said second group ranging from 0 to about 5, the added alkali metal oxide $Cs_2O$ being selected for the balance of said sum where the mol per cent from said first group is less than about 3, and only $Cs_2O$ and $K_2O$ being jointly selected for the balance of said sum where the mol per cent from said first group is more than 3 and when two oxides of said second group are selected.

3. A pH-responsive glass electrode including an electrically conductive membrane of glass characterized by a low sodium error which at 25° C., 2 normal Na, at 12.8 pH, is less than pH 1.0, both after five days and after six months, the composition of said glass membrane being represented by a four-component prefusion mixture free of alkaline earth metals, the first component consisting of about 67 mol per cent to about 63 mol per cent silica, a second component consisting of about 26 mol per cent to about 28 mol per cent lithia, a third component consisting essentially of at least one oxide of about 3 mol per cent to about 5 mol per cent selected from a group consisting of $Mn_2O_3$ and the rare earth metal oxides including $La_2O_3$ and $Pr_2O_3$, and the balance a fourth component of about 3 mol per cent to about 5 mol per cent of at least one added alkali metal oxide selected from a second group consisting of the following: $Cs_2O$, $Rb_2O$, $K_2O$ and $Na_2O$, the sum of the mol per cent of the third and fourth components being not less than about 6 and not more than about 10, there being also present in each mixture including the alkali metal oxide $K_2O$ a mol per cent of at least one of said alkali metals $Cs_2O$ and $Rb_2O$ not less than about two-thirds of the mol per cent of $K_2O$, and there being also present in each mixture including the alkali metal oxide $Na_2O$ a mol per cent of at least one of the alkali metal oxides $Cs_2O$ and $Rb_2O$ about one and one-half times the mol per cent of $Na_2O$.

4. A pH-responsive electrode of glass whose composition is represented by a prefusion mixture consisting of about 28 mol per cent $Li_2O$, 64–67 mol per cent $SiO_2$, about 3 mol per cent $Cs_2O$ and from 3 to 5 mol per cent $La_2O_3$.

5. A pH-responsive electrode of glass whose composition is represented by a prefusion mixture consisting of about 28 mol per cent $Li_2O$, about 65 mol per cent $SiO_2$, about 3 mol per cent $Cs_2O$, and about 4 mol per cent $Pr_2O_3$.

6. A pH-responsive electrode of glass whose composition is represented by a prefusion mixture consisting of about 26 mol per cent $Li_2O$, about 65 mol per cent $SiO_2$, about 3 mol per cent $K_2O$, and a total of about 6 mol per cent $Cs_2O$ with $La_2O_3$.

GEORGE A. PERLEY.

REFERENCES CITED

The following references are of record in the file of this patent:

UNITED STATES PATENTS

| Number | Name | Date |
| --- | --- | --- |
| 1,233,486 | Locke | July 17, 1917 |
| 2,215,039 | Hood et al. | Sept. 17, 1940 |
| 2,462,843 | Cary et al. | Mar. 1, 1949 |

OTHER REFERENCES

"Glass Electrode," by Dole (John Wiley & Sons), 1941, pages 64, 74, 75, 79.